United States Patent Office.

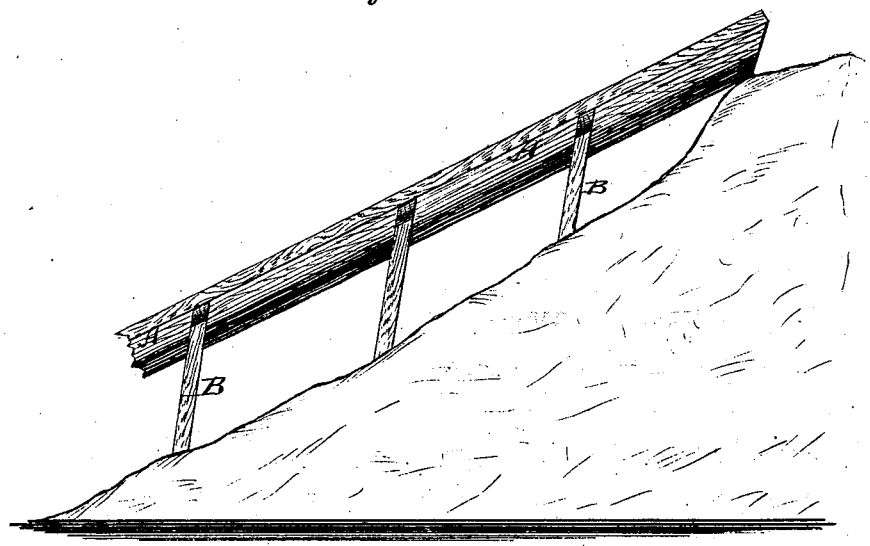
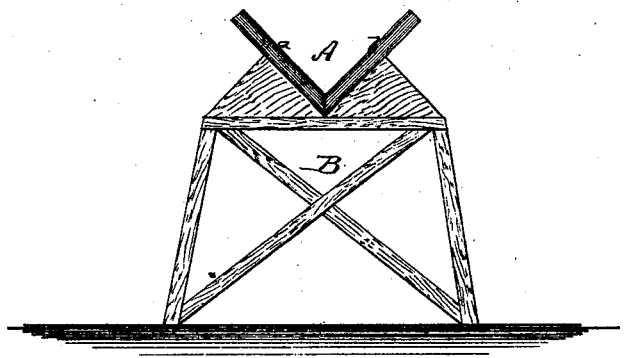

JAMES W. HAINES, OF GENOA, NEVADA.

Letters Patent No. 107,611, dated September 20, 1870.

IMPROVEMENT IN CHUTES FOR DELIVERING TIMBER.

The Schedule referred to in these Letters Patent and making part of the same

*To all whom it may concern:*

Be it known that I, JAMES W. HAINES, of Genoa, in the county of Douglas and State of Nevada, have invented a new and improved Chute for Delivering Timber from High Mountains; and I do hereby declare that the following is a full, clear, and exact description thereof, which will enable others skilled in the art to make and use the same, reference being had to the accompanying drawing forming part of this specification.

Figure 1 represents a side view of my improved chute.

Figure 2 is an end view of the same.

Similar letters of reference indicate corresponding parts.

This invention has for its object to furnish to the public an improved chute for facilitating the transportation of timber of all kinds from the tops or sides of mountains, or other elevations, and consists in constructing a chute so as to present a V-form in cross-section, the same being arranged on an incline corresponding, more or less, to the surface of the ground over which it passes, and brought in connection with a spring, or other water-supply, to receive the water therefrom, and thus form a smooth canal throughout its entire length.

Heretofore chutes for this purpose have been constructed with flat, or nearly flat, bottoms, which, while sufficiently objectionable as requiring a greater quantity of water to insure equal rapidity in the transit of the timber, are far more so for another reason, viz., the log or piece of timber, more especially at points where the inclination of the chute is slight, is liable to be checked in its descent by friction against the bottom and one side of the chute, and, when thus situated, others may pass it, thus leaving it to be again set in motion by manual assistance, or other logs striking it; the whole may become wedged together, so as to form a total obstruction to the passage of succeeding logs, destroy the chute at that point, or cause other serious injury, inconvenience, and, in any event, pecuniary loss.

A in the drawing represents a wooden trough made of two boards, $a$ and $b$, which are joined at an angle of about ninety degrees.

This trough is supported by trestles or frames B B, of suitable construction, and is built up on the side of a mountain, its upper end being connected with a brook, lake, stream, or spring, to receive a supply of running water, which may, if desired, be regulated by means of a suitable gate.

The timber or wood to be transported downwardly, is thrown into the trough, and carried down by the water in the same. A very rapid and convenient means of conveying wood is thus provided.

Having thus described my invention,

I claim as new and desire to secure by Letters Patent—

The chute A, of V-form, in cross-section, arranged on an incline in whole or in part, and adapted to receive a flow of water, for the conveyance of timber, as set forth.

J. W. HAINES.

Witnesses:
C. H. VAN GORDON,
J. R. JOHNSON.